United States Patent
Seo et al.

(10) Patent No.: US 10,233,678 B2
(45) Date of Patent: Mar. 19, 2019

(54) APPARATUS FOR PREVENTING DOOR OF VEHICLE FROM OPENING DURING COLLISION

(71) Applicant: Hyundai Motor Company, Seoul (KR)

(72) Inventors: Yong-Dae Seo, Gyeonggi-do (KR); Jung-Ho Han, Seoul (KR)

(73) Assignee: Hyundai Motor Company, Seoul (KR)

( * ) Notice: Subject to any disclaimer, the term of this patent is extended or adjusted under 35 U.S.C. 154(b) by 313 days.

(21) Appl. No.: 15/085,000

(22) Filed: Mar. 30, 2016

(65) Prior Publication Data

US 2017/0096843 A1    Apr. 6, 2017

(30) Foreign Application Priority Data

Oct. 2, 2015   (KR) .................. 10-2015-0139219

(51) Int. Cl.
*B60J 5/04* (2006.01)
*E05B 77/06* (2014.01)
*E05B 79/20* (2014.01)

(52) U.S. Cl.
CPC ............ *E05B 77/06* (2013.01); *B60J 5/0493* (2013.01); *E05B 79/20* (2013.01)

(58) Field of Classification Search
CPC .......... E05B 77/06; E05B 79/20; B60J 5/0493
See application file for complete search history.

(56) References Cited

U.S. PATENT DOCUMENTS

| 2013/0056999 A1 | 3/2013 | Beck |
| 2014/0232122 A1* | 8/2014 | Schnetter ............... E05B 77/06 292/336.3 |
| 2014/0312633 A1 | 10/2014 | Ilardo et al. |

FOREIGN PATENT DOCUMENTS

| EP | 1614583 B1 | 10/2008 |
| JP | 2004-316122 | 11/2004 |
| JP | 2007-177475 A | 7/2007 |
| JP | 2008-088748 A | 4/2008 |
| JP | 2013-177799 A | 9/2013 |
| KR | 100206427 B1 | 7/1999 |
| KR | 100836121 B1 | 6/2008 |
| KR | 101282575 B1 | 7/2013 |

* cited by examiner

*Primary Examiner* — Kristina R Fulton
*Assistant Examiner* — Thomas L Neubauer
(74) *Attorney, Agent, or Firm* — Mintz Levin Cohn Ferris Glovsky and Popeo, P.C.; Peter F. Corless

(57) ABSTRACT

An apparatus for preventing a door of a vehicle from opening during a collision is provided. The door includes a cable that is connected to an exterior door handle and a connection bushing that is connected to the cable and coupled to an operating lever. When the exterior door handle is manipulated, the operating lever is moved upward to release a door latch. Additionally, an opening prevention unit is configured to allow the connection bushing to move upward under normal conditions, and when a vehicle collision occurs, the opening prevention unit is displaced from an original position to block upward movement of the connection bushing and prevent the door from opening.

2 Claims, 13 Drawing Sheets under normal conditions, a connection bushing may be moved upward, and when a vehicle collision occurs, the opening prevention
APPARATUS FOR PREVENTING DOOR OF VEHICLE FROM OPENING DURING COLLISION

CROSS-REFERENCE TO RELATED APPLICATIONS

This application claims priority to Korean Patent Application No. 10-2015-0139219, filed on Oct. 2, 2015, which is incorporated herein by reference in its entirety.

BACKGROUND

Field of the Invention

The present invention relates to a vehicle door; and, more particularly, to an apparatus that prevents a vehicle door from opening due to impact force generated during a vehicle collision.

Description of Related Art

When a vehicle collision occurs, a vehicle door must be maintained with a locked door latch to prevent an occupant from falling out of the vehicle. In other words, although the vehicle door must be allowed to open to enable a rescue after a vehicle collision has occurred, the door latch must also be maintained in the locked state during the vehicle collision to prevent the vehicle door from inadvertently opening due to impact force and thus prevent the occupant from falling out of the vehicle.

Accordingly, conventional techniques have been developed in which a balance weight, a blocking lever or the like are connected to an exterior handle of the vehicle door to maintain the door latch in the locked state during a collision. However, the conventional techniques refer to coping with a side collision of a vehicle but are not capable of maintaining the locked state of the vehicle door during a front or rear collision.

SUMMARY

An exemplary embodiment of the present invention is directed to an apparatus for preventing a vehicle door from opening during a collision, the apparatus may include a door latch prevented from being released due to impact force during a collision regardless of the direction of the collision, thus preventing the vehicle door from opening during the collision even when the impact force is applied to the vehicle in any direction, thereby preventing an occupant from falling out of the vehicle.

Other objects and advantages of the present invention may be understood by the following description, and become apparent with reference to the exemplary embodiments of the present invention. Additionally, it is obvious to those skilled in the art to which the present invention pertains that the objects and advantages of the present invention may be realized by the means as claimed and combinations thereof.

In accordance with an exemplary embodiment of the present invention, an apparatus for preventing a door of a vehicle from opening during a collision is provided. The door may include a cable connected to an exterior door handle, and a connection bushing connected to the cable and coupled to an operating lever and thus, when the exterior door handle is manipulated, the operating lever may be moved upward to release a door latch. The apparatus may include an opening prevention unit in which, under normal conditions the connection bushing may be moved upward, and when a vehicle collision occurs, the opening prevention unit may be displaced from an original position to block upward movement of the connection bushing and prevent the door from opening.

The opening prevention unit may include a lock ring having a cylindrical or annular shape, and installed and supported in the door to allow the connection bushing to pass through the lock ring. The lock ring may be supported by a support unit mounted to a bracket disposed in the door. The support unit may include a spring installed between the bracket and the lock ring. The spring may include a plurality of springs installed at positions spaced apart from each other at a predetermined angular interval, wherein one of the springs (e.g., a first spring) may be installed to be compressed or expanded when a collision occurs with respect to a lateral direction of the vehicle, and another one of the springs (e.g., a second spring) may be installed to be compressed or expanded when a collision occurs with respect to a longitudinal direction of the vehicle. When an inertia force greater than a preset reference inertia force, over which the inertia force is determined as being caused by a collision, is applied to the spring, the spring may be compressed or expanded and the lock ring may be displaced from the original position.

In accordance with an apparatus for preventing a door of a vehicle from opening during a collision according to the present invention having the above-mentioned configuration, when a vehicle collision occurs, the lock ring may be displaced from an initial position to prevent the connection bushing from moving upward through the lock ring, thus preventing the door latch from being inadvertently released. Consequently, the present invention may prevent an occupant from falling out of the vehicle due to opening of the vehicle door during the vehicle collision.

BRIEF DESCRIPTION OF THE DRAWINGS

The above and other objects, features and other advantages of the present invention will be more clearly understood from the following detailed description taken in conjunction with the accompanying drawings, in which.

DEATILED DESCRIPTION

Figure 1:
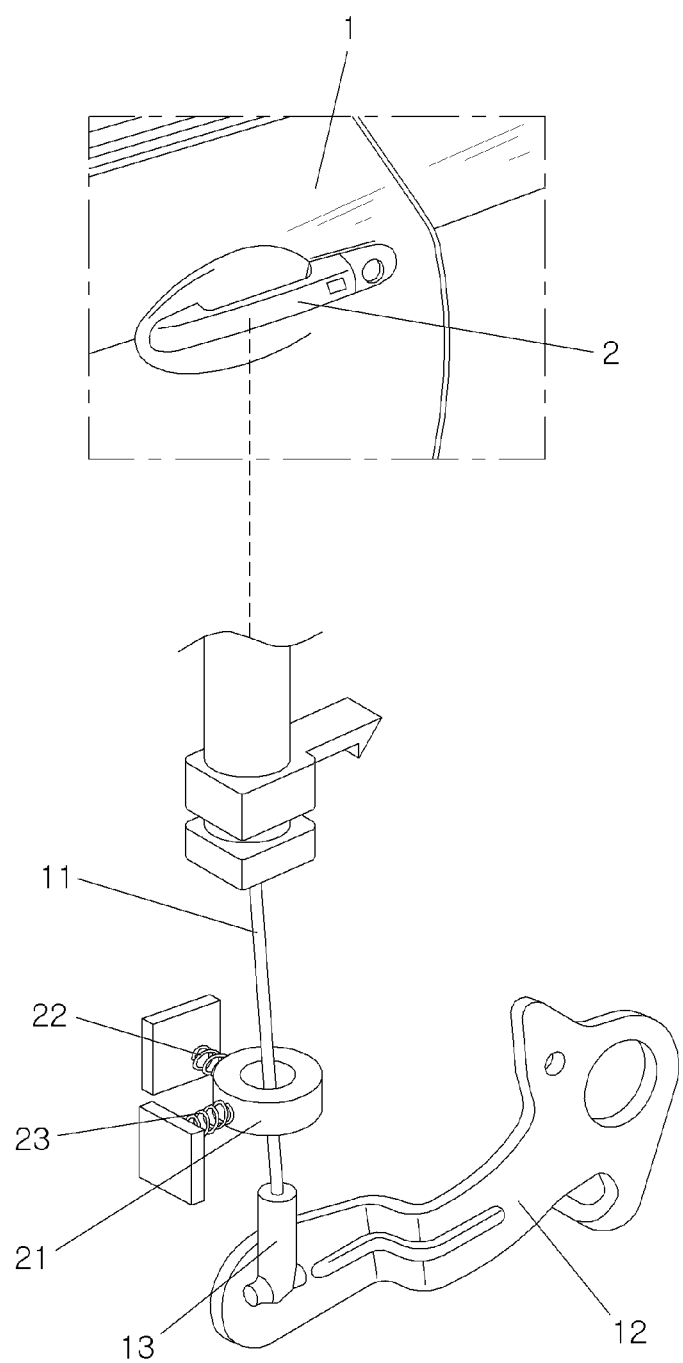
FIG. 1 is a view illustrating an apparatus for preventing a door of a vehicle from opening during a collision according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, an apparatus for preventing a door of a vehicle from opening during a collision according to an exemplary embodiment of the present invention will be described in detail with reference to the attached drawings.

With regard to the door opening prevention apparatus according to the exemplary embodiment of the present invention, the vehicle door may include a cable 11 connected to an exterior door handle 2, and a connection bushing 13 connected to the cable 11 and coupled to an operating lever 12 and thus, when the outside door handle 2 is manipulated, the operating lever 12 may be moved upward to release a door latch. The door opening prevention apparatus may include an opening prevention unit and under normal conditions (e.g., when no collision occurs) the connection bushing 13 may be configured to move upward, and when a vehicle collision occurs, the opening prevention unit may be displaced from an original position to block the upward movement of the connection bushing 13 and thus prevent the vehicle door from opening.

The door latch (not shown) may be installed within the vehicle door to releasably lock the vehicle door. Additionally, the door latch may be operated by manipulation of the exterior door handle 2 installed on an outer surface of the vehicle door. The exterior door handle 2 installed on the outer surface of the vehicle door may be manipulated by a pulling action of the exterior door handle 2 to open the vehicle door, but the invention is not limited thereto, other actions may be used to open the vehicle door.

The operating lever 12 for operating the door latch may be installed within the vehicle door. In particular, the operating lever 12 may be disposed at a side of the door latch. When the operating lever 2 is rotated by rotating one end thereof, the door latch may maintain a locked state of the vehicle door or release the locked state of the vehicle door. The cable 11 and the connection bushing 13 may be disposed between the exterior door handle 2 and the operating lever 12 to transmit the force of operating the exterior door handle 2 to the operating lever 12. The cable 11 may be connected to the exterior door handle 2 and may be configured to transmit the force of operating the outside door handle 2 to the inside of the vehicle door.

The connection bushing 13 may be fixed at an upper end thereof to a lower end of the cable 11, and a lower end thereof may be coupled to the end of the operating lever 12. The connection bushing 13 may be connected to the cable 11 and thus moved upward or downward (e.g., vertically) by the cable 11. When the connection bushing 13 moves upward, the operating lever 12 may be rotated to release the locked state of the door latch thus causing the vehicle door to open.

Due to the above-mentioned configuration installed in the vehicle door, the locked state of the door latch may be released when the exterior door handle 2 is manipulated. The door opening prevention apparatus according to the present exemplary embodiment may include the opening prevention unit configured to prevent the locked state of the door latch from being inadvertently released when the exterior door handle 2 is manipulated by impact force generated during a vehicle collision.

Particularly, the opening prevention unit may disposed on a path along which the connection bushing 13 moves, and the connection bushing 13 may be allowed to move upward under normal conditions (e.g., the connection housing 13 may be moved upward when no collision occurs, that is, the motion of the connection housing 13 is not prevented).

Conversely, when a vehicle collision occurs, the upward movement of the connection bushing 13 may be blocked and thus the locked state of the door latch may be prevented from being released.

Figure 2:
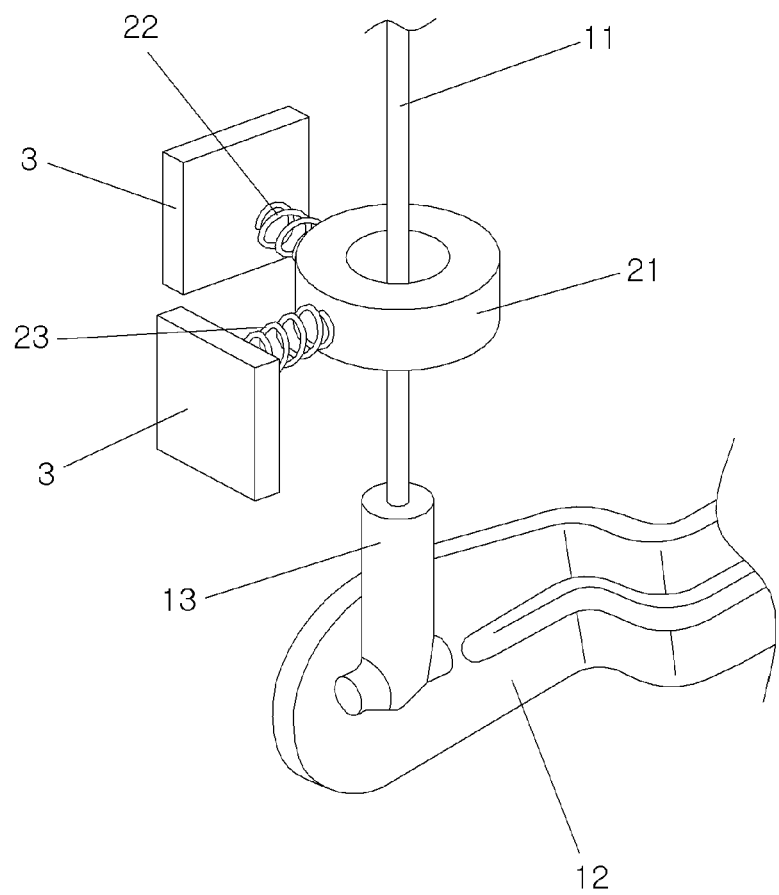
FIG. 2 is a detailed view showing a critical portion of the door opening prevention apparatus according to an exemplary embodiment of the present invention.
Figure 3:
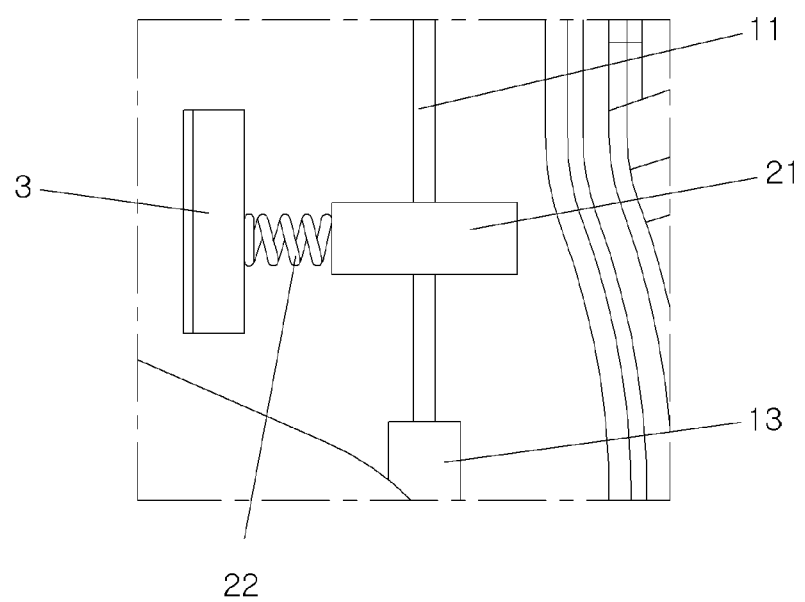
FIG. 3 is a side view illustrating the door opening prevention apparatus according to an exemplary embodiment of the present invention.
Figure 4:
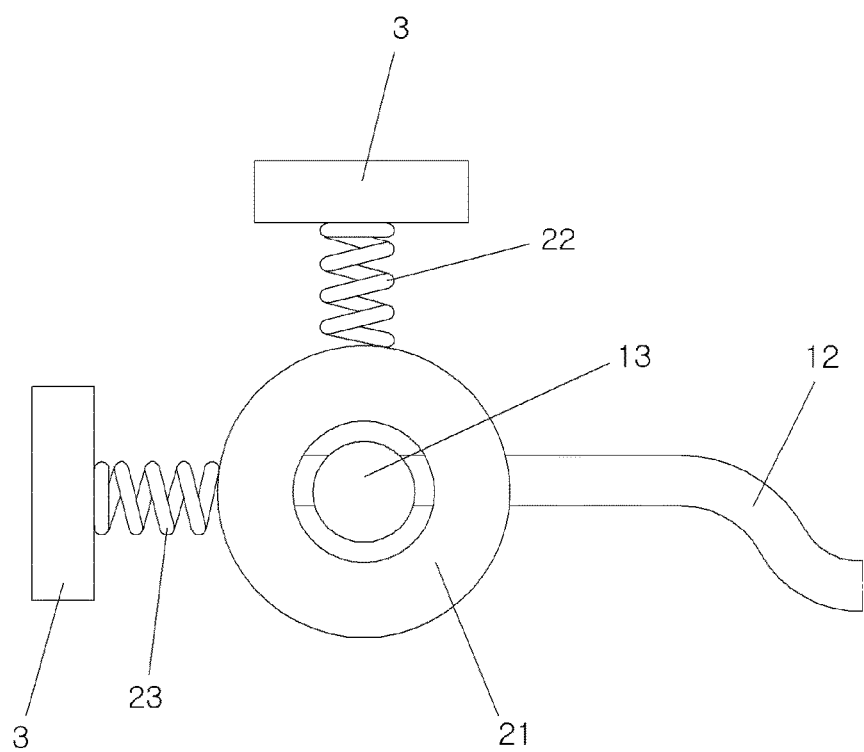
FIG. 4 is a plan view illustrating the door opening prevention apparatus according to an exemplary embodiment of the present invention.

In an exemplary embodiment, as shown in FIG. 2, the opening prevention unit may include a lock ring 21. The lock ring 21 may have a cylindrical or annular shape with a hollow structure which is open on opposite ends thereof. The cable 11 may pass through the open central portion of the lock ring 21. The connection bushing 13 may be disposed below the lock ring 21 at a position spaced apart the lock ring 21 by a predetermined distance. Under normal conditions, the lock ring 21 may be positioned with the center thereof aligned with the centers of the cable 11 and connection bushing 13. In particular, the lock ring 21 allows the connection bushing 13 to pass therethrough. For example, the inner diameter of the lock ring 21 may be greater than the outer diameter of the connection bushing 13 and thus, when the exterior door handle 2 is manipulated, the connection bushing 13 may be inserted into or pass through the lock ring 21.

However, when a vehicle collision occurs, the lock ring 21 may be displaced from an original position by inertia force or impact force. When the lock ring 21 is displaced from the original position, the lock ring 21 may interfere with or block the path of the movement of the connection bushing 13, thus blocking the upward movement of the connection bushing 13. Accordingly, the operating lever 12 may not be operated. Furthermore, at least one support unit may be disposed on the side surface of the lock ring 21 to allow the lock ring 21 to be maintained at an original position under normal conditions and, when a collision occurs, the lock ring 21 may be moved from the original position.

An exemplary embodiment of the support unit for supporting the lock ring 21 may include springs 22 and 23 each of which may be installed between a corresponding bracket 3 and the lock ring 21. In particular, the brackets 3 to which the respective springs 22 and 23 are fixed may be disposed within the vehicle door 1. The springs 22 and 23 may be installed between the corresponding brackets 3 and the lock ring 21.

In an exemplary embodiment, two springs 22 and 23 may be installed on the lock ring 21 at positions spaced apart from each other by a predetermined angular distance. The springs 22 and 23 may include a first spring 22 installed to be compressed or expanded in a lateral direction of the vehicle during a collision, and a second spring 23 installed to be compressed or expanded in a longitudinal direction of the vehicle during a collision. Since the first spring 22 and the second spring 23 may be installed on the lock ring 21 at positions spaced apart from each other by a predetermined angular distance, the first and second springs 22 and 23 may act against force generated by collisions in different directions (including a lateral collision and a longitudinal collision).

In particular, unless inertia force having a predetermined magnitude or more caused by a vehicle collision is applied to the lock ring 21, the first and second springs 22 and 23 may be maintained at positions spaced apart from the brackets 3 within the vehicle door by a predetermined distance rather than being compressed or expanded since the door opening prevention apparatus is not operated during a normal acceleration or deceleration operation rather than a collision. For example, the first and second springs 22 and 23 may set in which when inertia force greater than a preset magnitude over which it is determined as being caused by a collision is applied thereto the first or second spring 22 or 23 may be compressed or expanded. In other words, when inertia force having a predetermined magnitude or more is applied regardless of a direction the lock ring 21 may be displaced from an original position.

The operation of the door opening prevention apparatus according to the present invention having the above-mentioned configuration will be described below. FIGS. 2 to 6 illustrate the state of the door opening prevention apparatus under normal conditions (e.g., when no collision occurs). Under normal conditions, the lock ring 21 may be disposed at an original position (e.g., a position at which the lock ring allows upward movement of the connection busing), and the center of the lock ring 21 may be aligned with the center of the connection bushing 13. Therefore, the connection bushing 13 may be inserted into the lock ring 21.

Figure 5:
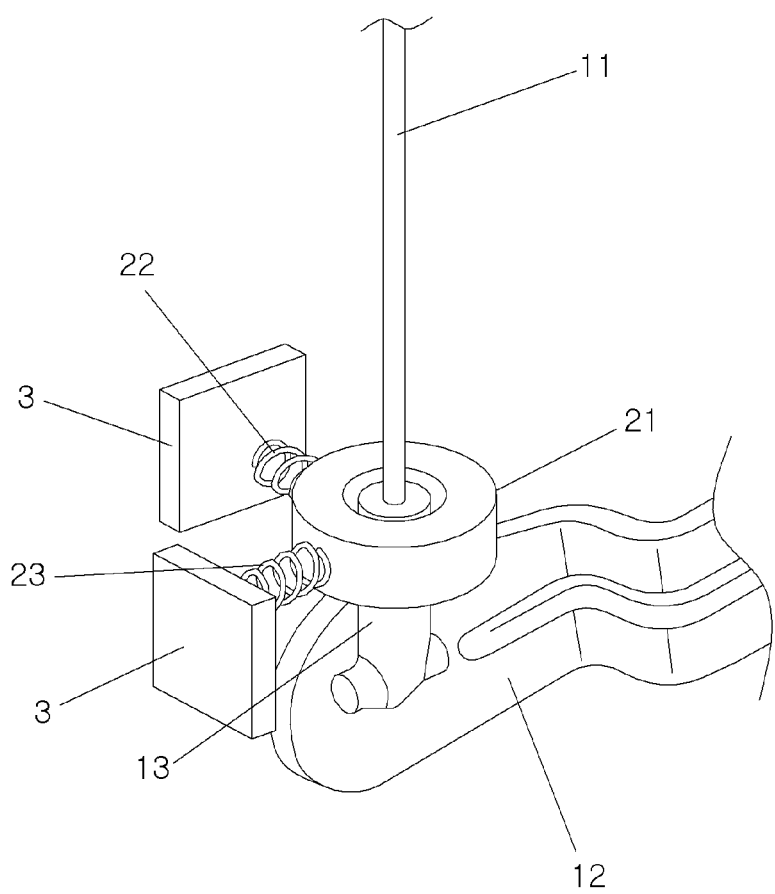
FIG. 5 is a view illustrating the operation of the door opening prevention apparatus according to an exemplary embodiment of the present invention.
Figure 6:
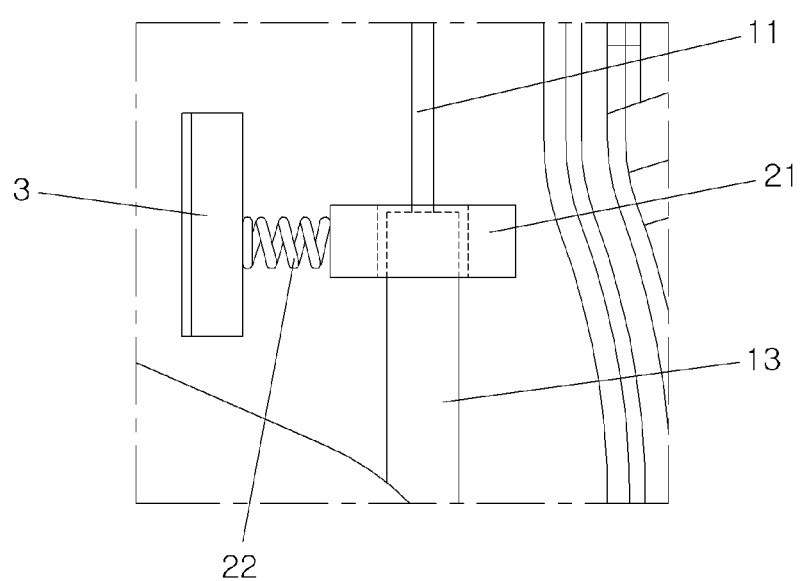
FIG. 6 is a side view illustrating the operation of the door opening prevention apparatus according to an exemplary embodiment of the present invention under normal conditions.
Figure 7:
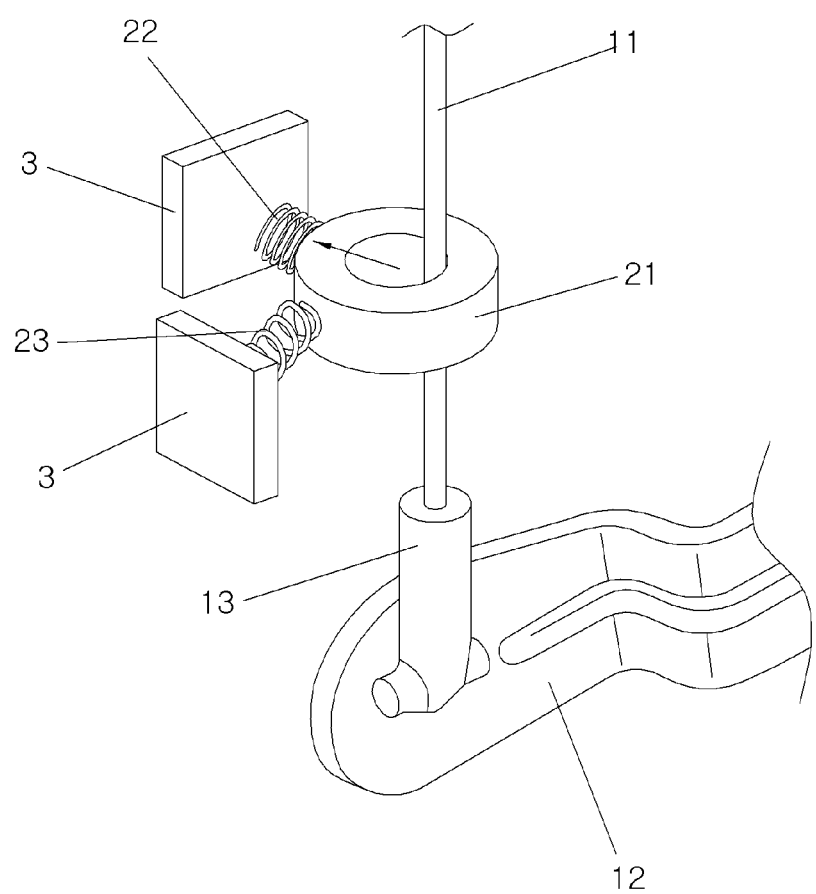
FIG. 7 is a perspective view illustrating the door opening prevention apparatus according to an exemplary embodiment of the present invention before operation during a side collision.
Figure 8:
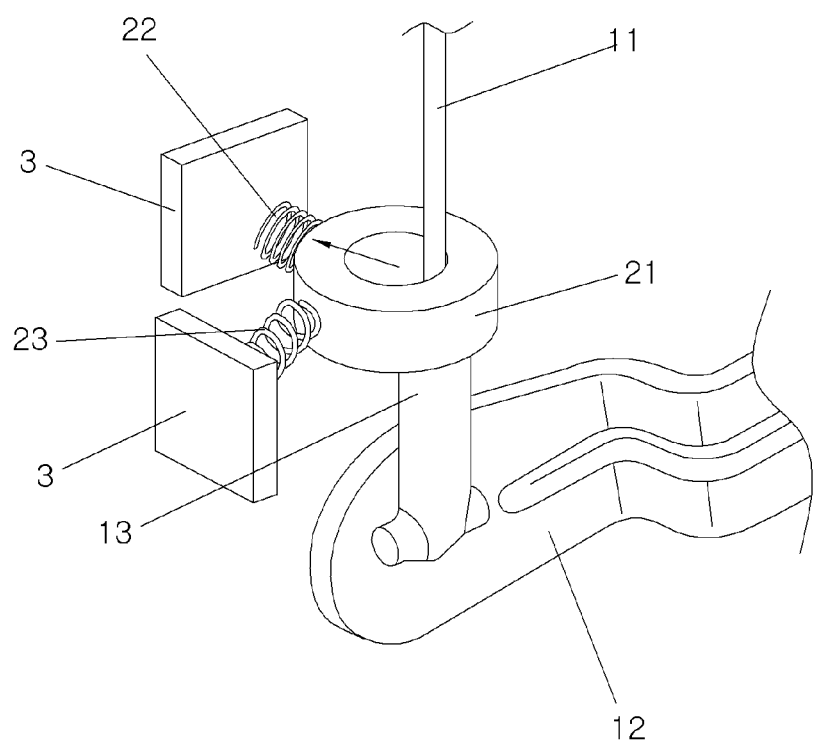
FIG. 8 is a view illustrating the door opening prevention apparatus according to an exemplary embodiment of the present invention during operation during a side collision.
Figure 9:
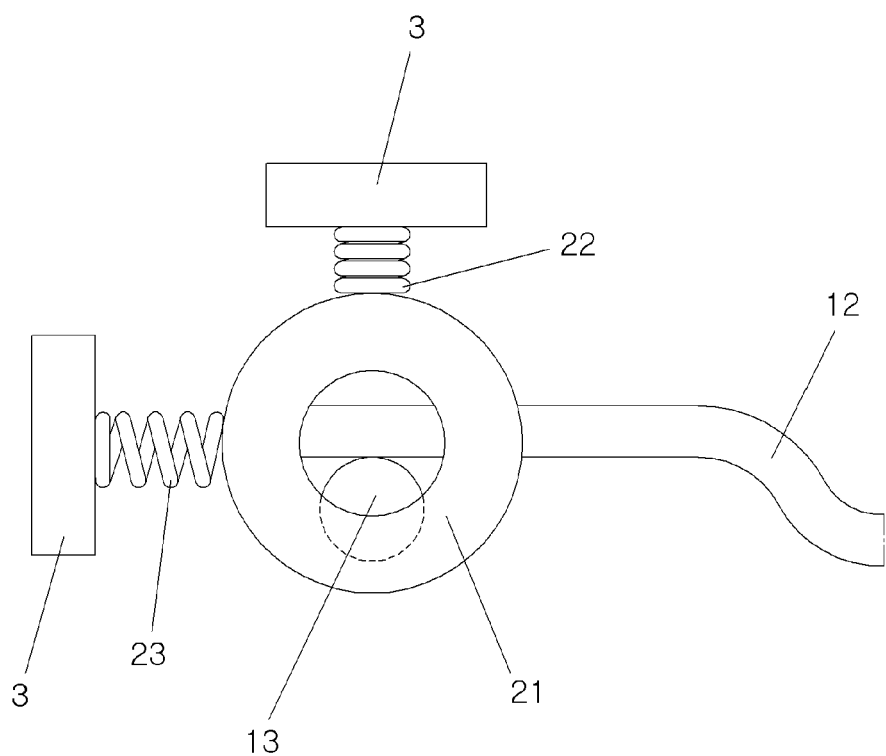
FIG. 9 is a plan view illustrating the door opening prevention apparatus according to an exemplary embodiment of the present invention when it is in operation during a side collision.
Figure 10:
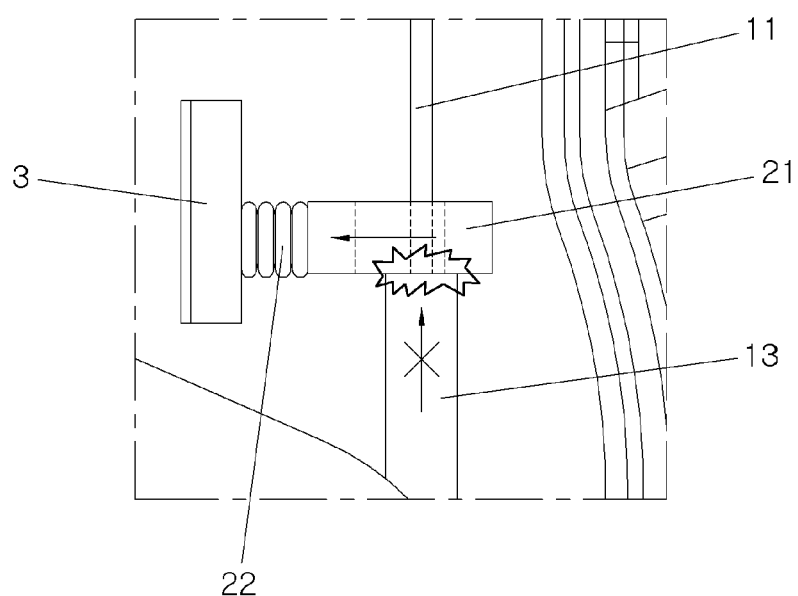
FIG. 10 is a side view illustrating the door opening prevention apparatus according to an exemplary embodiment of the present invention when it is in operation during a side collision.

In particular, when the exterior door handle 2 is manipulated to open the vehicle door, as shown in FIGS. 5 and 6, the cable 11 along with the connection bushing 13 may be moved upward. Then, the operating lever 12 may be rotated, causing the release of the door latch.

The state of the door opening prevention apparatus during a side collision will be explained with reference to FIGS. 7 to 10. When a side collision occurs, impact force is applied to the lock ring 21 in the lateral direction of the vehicle. Thus, the lock ring 21 may be moved from an initial position in the lateral direction of the vehicle. For example, when impact force due to the vehicle collision is applied to the lock ring 21, the lock ring 21 may move in a direction in which the first spring 22 is compressed, while overcoming the elastic force of the first spring 22.

At this time, when the exterior door handle 2 is pulled by inertia force resulting from the collision impact force, the cable 11 and the connection bushing 13 may be pulled upward. However, since the lock ring 21 may be displaced from an initial position, an upper end of the connection bushing 13 may be blocked by a lower surface of the lock ring 21, preventing the connection bushing 13 from passing through the lock ring 21. Accordingly, since the connection bushing 13 is prevented from moving upward to a sufficient distance, the operating lever 12 operated by upward movement of the connection bushing 13 may not be rotated. Thus, the door latch may be maintained in the locked state. Consequently, the vehicle door may be prevented from inadvertently opening due to the collision impact force and may be maintained in the closed state.

Figure 11:
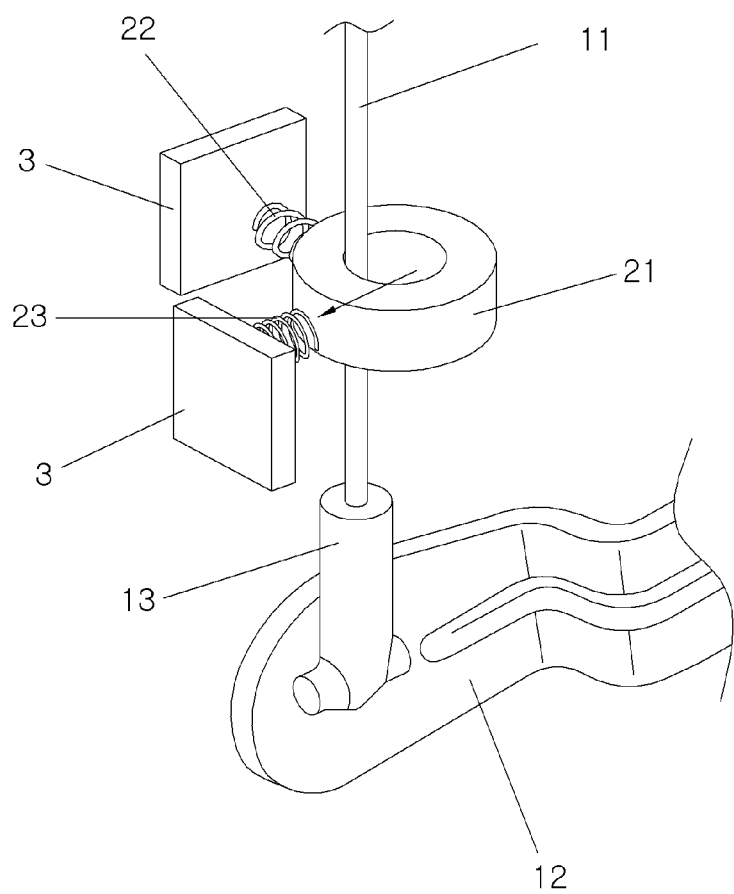
FIG. 11 is a perspective view illustrating the door opening prevention apparatus according to an exemplary embodiment of the present invention before it is operated during a front collision.
Figure 12:
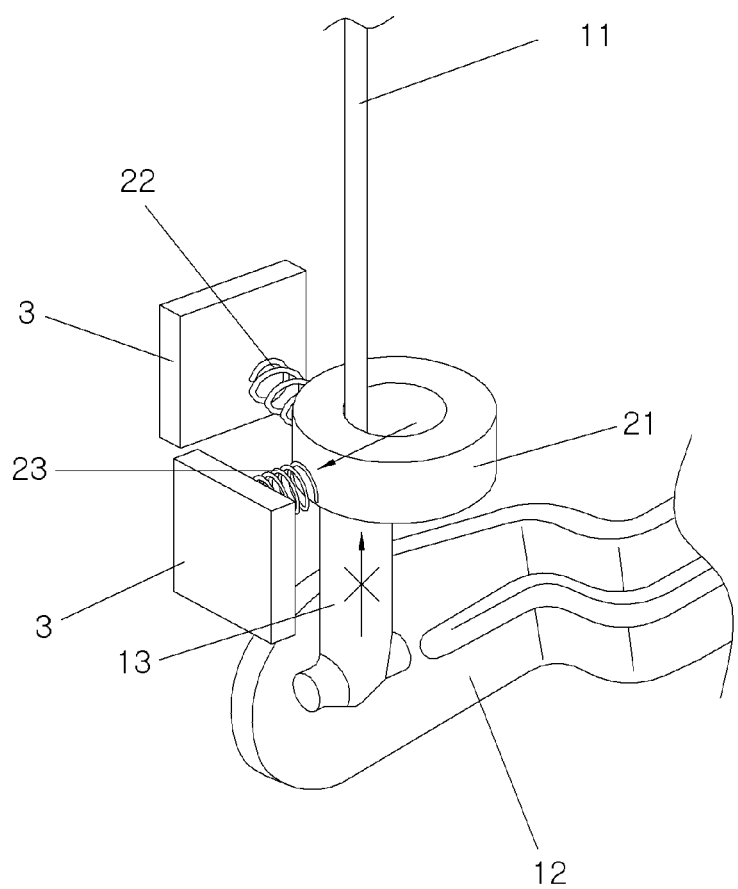
FIG. 12 is a perspective view illustrating the door opening prevention apparatus according to an exemplary embodiment of the present invention when it is in operation during a front collision.
Figure 13:
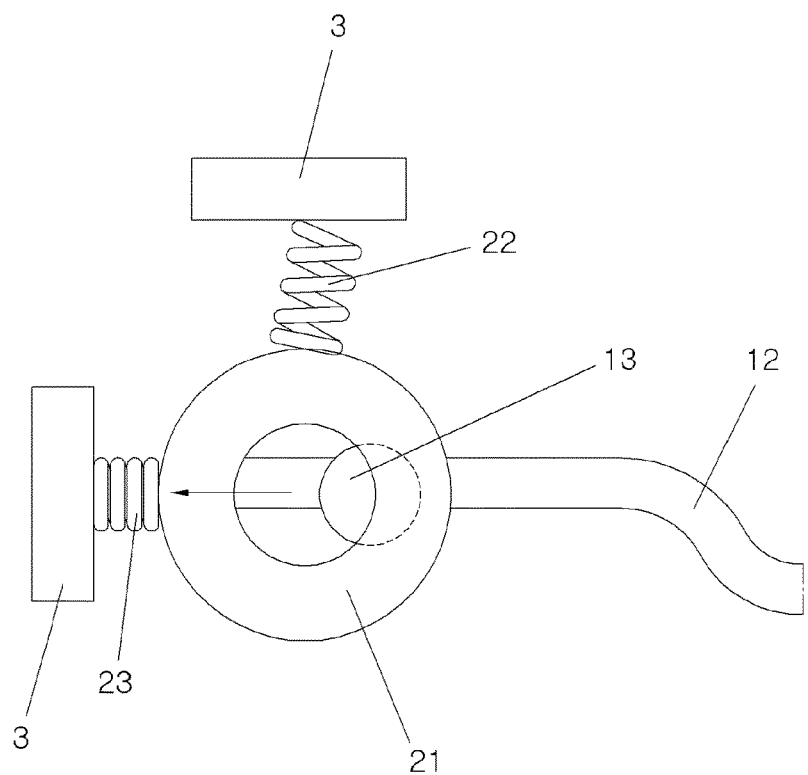
FIG. 13 is a plan view illustrating the door opening prevention apparatus according to an exemplary embodiment of the present invention before it is operated during a front collision.

FIGS. 11 to 13 illustrate the state of the door opening prevention apparatus during a front collision. When a front collision occurs, impact force may be applied to the lock ring 21 in the longitudinal direction of the vehicle. Thus, the lock ring 21 may be moved from an initial position in the longitudinal direction of the vehicle. For example, when the front collision of the vehicle occurs, the lock ring 21 may be moved forward by inertia while compressing the second spring 23 and may be displaced from an original position. In particular, the vehicle door may be involved in a so-called tear-off phenomenon by the collision impact force. Thus, the exterior door handle 2 may be inadvertently operated. When the exterior door handle 2 is operated, the cable 11 and the connection bushing 13 may be pulled upward. However, since the center of the lock ring 21 may be misaligned from the center of the connection bushing 13 by the displacement of the lock ring 21, the connection bushing 13 may not be inserted into the lock ring 21. In the same manner as that in the side collision, the operating lever 12 may be prevented from being rotated thus maintaining the door latch in the locked state.

Although the operation of the door opening prevention apparatus during the side or front collision of the vehicle has been described, the door opening prevention apparatus may be operated regardless of the direction of the vehicle collision. In other words, even when impact force caused by a collision is applied to the lock ring 21 in any direction, the lock ring 21 may be displaced from an initial position causing the center of the lock ring 21 to be misaligned from the center of the connection bushing, thus preventing the connection bushing 13 from moving upward through the lock ring 21. Consequently, the operating lever 12 may be prevented from rotating, and the door latch may be maintained in the locked state.

As described above, in the door opening prevention apparatus according to the present invention, even when impact force is applied to the vehicle by a collision, the door latch may be maintained in the locked state, thus preventing an occupant from falling out of the vehicle due to opening of the vehicle door during the collision. Meanwhile, after the collision has been completed, the lock ring 21 may be returned to an initial position by the elastic force of the first or second spring 22 or 23 since the impact force applied to the vehicle is removed. After the lock ring 21 has been returned to the original position, when the exterior door handle 2 is manipulated from the exterior of the vehicle, the connection bushing 13 may again move upward and rotate the operating lever 12 to release the door latch. Therefore, the vehicle door may return to normal operation, thus making it possible for a rescue worker or the like to open the vehicle door from the exterior and rescue the occupant in the vehicle.

While the present invention has been described with respect to the specific exemplary embodiments, it will be apparent to those skilled in the art that various changes and modifications may be made without departing from the spirit and scope of the invention as defined in the following claims.

What is claimed is:

1. An apparatus for preventing a vehicle door from opening during a collision, comprising:
   a connection bushing connected to a cable of the vehicle door and coupled to an operating lever, wherein the operating lever is moved upward to release a door latch when an exterior door handle connected to the cable is manipulated;
   a lock ring configured to allow the connection busing to move upward under normal conditions, and when a vehicle collision occurs, the lock ring is displaced from an original position to block the upward movement of the connection bushing and prevent the door from opening,
   wherein the lock ring has a cylindrical or annular shape, and is installed and supported in the door to allow the connection bushing to pass through the lock ring,
   wherein the lock ring is supported by a spring mounted to a bracket indisposed within the vehicle door,
   wherein the spring is installed between the bracket and the lock ring,
   wherein one of the springs is installed in a lateral direction of the vehicle in order to be compressed or expanded when a collision occurs with respect to the lateral direction of the vehicle, and another one of the springs is installed in a longitudinal direction of the vehicle in order to be compressed or expanded when a collision occurs with respect to the longitudinal direction of the vehicle.

2. The apparatus according to claim 1, wherein when an inertia force greater than a preset reference inertia force, over which the inertia force is determined as being caused by a collision, is applied to the spring, the spring is compressed or expanded and the lock ring is displaced from the original position.

* * * * *